(12) United States Patent
Monismith et al.

(10) Patent No.: US 11,462,791 B2
(45) Date of Patent: Oct. 4, 2022

(54) ELECTRIC VEHICLE BATTERY CELL STRUCTURE

(71) Applicant: CHONGQING JINKANG POWERTRAIN NEW ENERGY CO., LTD., Chongqing (CN)

(72) Inventors: Scott Quinlan Freeman Monismith, Santa Clara, CA (US); Jeremy Elsberry, Santa Clara, CA (US); Brennan Campbell, Santa Clara, CA (US); Derek Nathan Wong, Santa Clara, CA (US); Ying Liu, Santa Clara, CA (US); Yifan Tang, Santa Clara, CA (US)

(73) Assignee: CHONGQING JINKANG POWERTRAIN NEW ENERGY CO., LTD., Chongqing (CN)

( * ) Notice: Subject to any disclaimer, the term of this patent is extended or adjusted under 35 U.S.C. 154(b) by 53 days.

(21) Appl. No.: 16/237,501

(22) Filed: Dec. 31, 2018

(65) Prior Publication Data
US 2020/0212382 A1      Jul. 2, 2020

(51) Int. Cl.
*H01M 50/20*     (2021.01)
*H01M 10/04*     (2006.01)
*H01M 4/02*      (2006.01)

(52) U.S. Cl.
CPC ......... *H01M 50/20* (2021.01); *H01M 10/049* (2013.01); *H01M 10/0422* (2013.01); *H01M 10/0459* (2013.01); *H01M 2004/029* (2013.01)

(58) Field of Classification Search
CPC ............. H01M 50/20; H01M 10/0422; H01M 10/0459; H01M 2004/029
See application file for complete search history.

(56) References Cited

U.S. PATENT DOCUMENTS

| | | | |
|---|---|---|---|
| 2010/0081052 A1* | 4/2010 | Morishima | H01M 4/485 429/211 |
| 2012/0040231 A1* | 2/2012 | Hagiwara | H01G 11/52 29/25.03 |
| 2015/0295270 A1* | 10/2015 | Chun | H01M 10/0431 429/94 |
| 2018/0083251 A1* | 3/2018 | Newman | H01M 50/543 |
| 2018/0219245 A1* | 8/2018 | Choi | H01M 50/116 |

* cited by examiner

*Primary Examiner* — Bethany L Martin
(74) *Attorney, Agent, or Firm* — Cooper Legal Group LLC

(57) ABSTRACT

Provided herein are systems, apparatuses, and methods of providing electrical energy for electric vehicles. A battery pack can be disposed in an electric vehicle to power the electric vehicle. A battery cell can be arranged in the battery pack. The battery cell can have a housing. The housing can define a cavity within the housing. The battery cell can have an electrode structure arranged within the cavity. The electrode structure can include a first polarity electrode plate, a second polarity electrode plate, and at least one separator. First and second polarity tabs are coupled with the first and second polarity electrode plates, respectively. The tabs include a flat surface, an electrode interface surface and at least one intermediate surface that extends therebetween. The at least one intermediate surface forms an acute angle with the electrode interface surface.

19 Claims, 10 Drawing Sheets

ELECTRIC VEHICLE BATTERY CELL STRUCTURE

BACKGROUND

Batteries can include electrochemical cells to supply electrical power to various electrical components connected thereto. Such batteries can be installed in a vehicle such as an automobile to provide electrical energy to various electrical systems installed within the vehicle.

SUMMARY

At least one aspect is directed to battery cell to power an electric vehicle. The battery cell includes a housing and an electrode structure disposed in the housing. The electrode structure includes a first polarity electrode plate, a second polarity electrode plate, a separator, and a first polarity tab. The first polarity electrode plate includes a first polarity metal plate and a first polarity current collector material disposed on the first polarity metal plate. The second polarity electrode plate includes a second polarity metal plate and a second polarity current collector material disposed on the second polarity metal plate. The separator is positioned between the first polarity electrode plate and the second polarity electrode plate, the separator having pores through which ions are exchanged between the first polarity electrode plate and the second polarity electrode plate. The first polarity tab electrically connects the first polarity electrode plate to a first polarity terminal of the battery cell. The first polarity tab includes an electrode interface surface coupled with the first polarity metal plate of the first polarity electrode plate, a flat surface opposite the electrode interface surface, and at least one intermediate surface that extends between the electrode interface surface and the flat surface and that forms an acute angle with the electrode interface surface. The battery cell is disposed in a battery pack to power an electric vehicle.

At least one aspect is directed to an electric vehicle. The electric vehicle can include a battery pack to power the one or more components of the electric vehicle. The electric vehicle can include a battery cell. The battery cell can be arranged in the battery pack. The battery cell can have a housing and an electrode structure disposed in the housing. The electrode structure includes a first polarity electrode plate, a second polarity electrode plate, a separator, and a first polarity tab. The first polarity electrode plate includes a first polarity metal plate and a first polarity current collector material disposed on the first polarity metal plate. The second polarity electrode plate includes a second polarity metal plate and a second polarity current collector material disposed on the second polarity metal plate. The separator is positioned between the first polarity electrode plate and the second polarity electrode plate, the separator having pores through which ions are exchanged between the first polarity electrode plate and the second polarity electrode plate. The first polarity tab electrically connects the first polarity electrode plate to a first polarity terminal of the battery cell. The first polarity tab includes an electrode interface surface coupled with the first polarity metal plate of the first polarity electrode plate, a flat surface opposite the electrode interface surface, and at least one intermediate surface that extends between the electrode interface surface and the flat surface and that forms an acute angle with the electrode interface surface. The battery cell is disposed in a battery pack to power an electric vehicle.

At least one aspect is directed to a method. The method can include providing battery cells, the battery cell disposed in a battery pack to power an electrical vehicle. The battery cell can include a housing and an electrode structure disposed in the housing. The electrode structure includes a first polarity electrode plate, a second polarity electrode plate, a separator, and a first polarity tab. The first polarity electrode plate includes a first polarity metal plate and a first polarity current collector material disposed on the first polarity metal plate. The second polarity electrode plate includes a second polarity metal plate and a second polarity current collector material disposed on the second polarity metal plate. The separator is positioned between the first polarity electrode plate and the second polarity electrode plate, the separator having pores through which ions are exchanged between the first polarity electrode plate and the second polarity electrode plate. The first polarity tab electrically connects the first polarity electrode plate to a first polarity terminal of the battery cell. The first polarity tab includes an electrode interface surface coupled with the first polarity metal plate of the first polarity electrode plate, a flat surface opposite the electrode interface surface, and at least one intermediate surface that extends between the electrode interface surface and the flat surface and that forms an acute angle with the electrode interface surface. The battery cell is disposed in a battery pack to power an electric vehicle.

At least one aspect is directed to a method of forming an electrode structure of a battery cell. The method can include disposing a first polarity tab on a first polarity electrode plate, the first polarity tab including an electrode interface surface coupled with a first polarity metal plate of the first polarity electrode plate, a flat surface opposite the electrode interface surface, and at least one intermediate surface that extends between the electrode interface surface and the flat surface and that forms an acute angle with the electrode interface surface. The method can include ultrasonically welding the first polarity tab to the first polarity electrode plate by positioning an ultrasonic welding tool on the flat surface of the first polarity tab. The method can include laser ablating weld burrs on the flat surface of the first polarity tab. The method further includes rolling the first polarity electrode plate, a second polarity electrode plate, and a separator separating the first polarity electrode plate and the second polarity electrode plate into an electrode structure.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
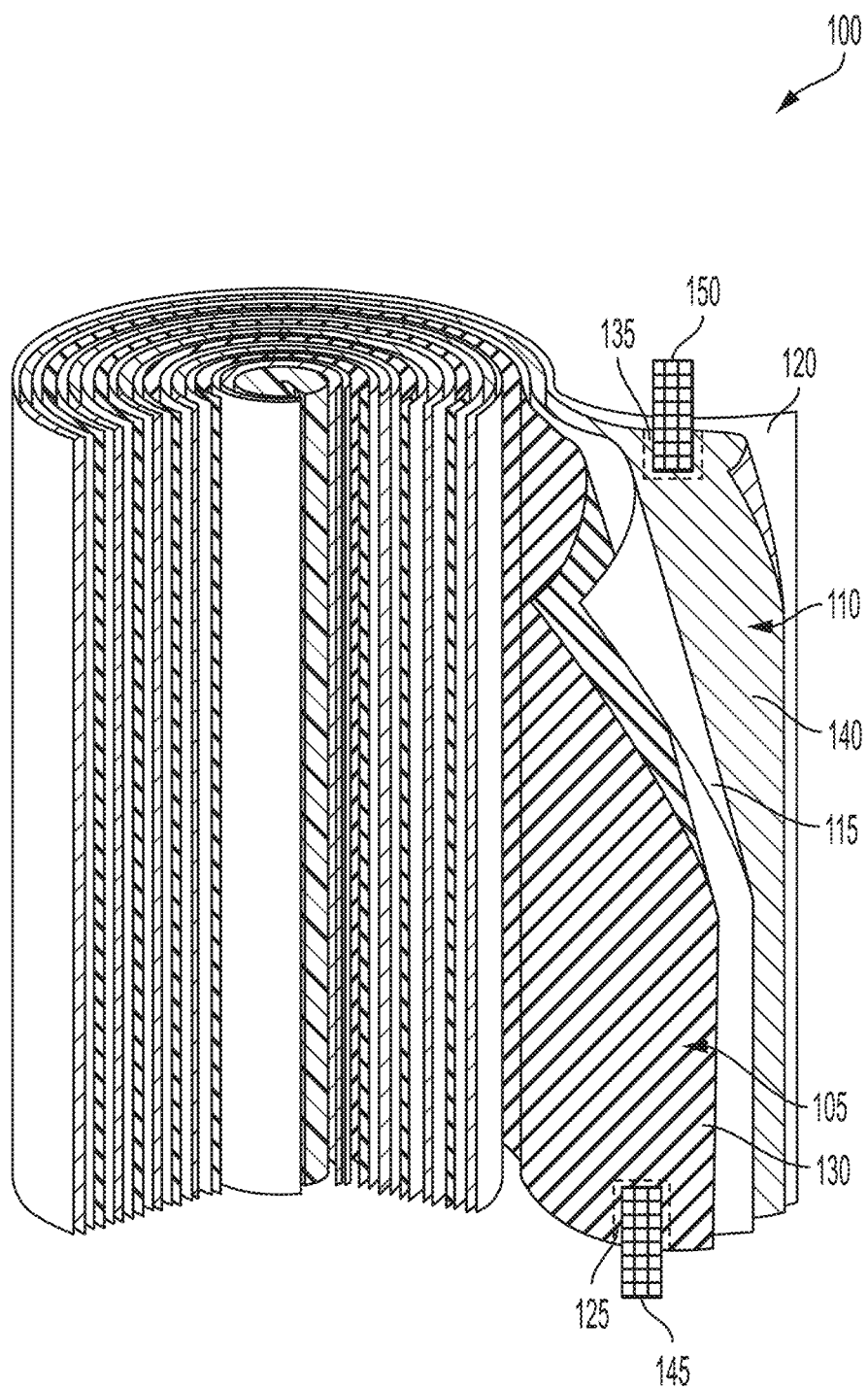
FIG. 1 depicts an isometric view of an example electrode structure.

Following below are more detailed descriptions of various concepts related to, and implementations of electrode structures of battery cells for battery packs in electric vehicles. The various concepts introduced above and discussed in greater detail below can be implemented in any of numerous ways.

One approach to forming battery cells includes separating a cathode plate and an anode plate by one or more separators. A cathode tab can be welded to the cathode plate while an anode tab can be welded to the anode plate using welding techniques such as ultrasonic welding. The cathode tab (anode tab) can provide an electrical connection between the cathode plate (anode plate) and a cathode terminal (anode terminal) of the battery cell. The separator can include an electrolyte, and can allow exchange of ions there through between the cathode plate and the anode plate. In some instances, due to mechanical loads, such as, for example, a compression load on the battery cell, the separator can be pressed against the cathode and anode tabs. The cathode and anode tabs may include sharp edges and may include weld burrs caused by the ultrasonic welding process. These sharp edges and the weld burrs, under the influence of the mechanical load, can puncture through the separator and make contact with the opposite polarity plate, thereby increasing the risk of a short circuit within the battery cell.

One approach to reducing the risk of short circuit can include reducing sharp edges on the cathode and anode tabs. For example, the tabs can include an electrode interface surface that is coupled with the respective electrode plate, and a flat surface opposite the electrode interface surface that interfaces with a welding tool. The tabs also can include at least one intermediate surface that extends between the flat surface and the electrode interface surface that forms an acute angle with the electrode interface surface. The acute angle can result in a filleted tab with no or reduced sharp edges, thereby reducing the risk of the filleted tab puncturing through the separator. In addition, the flat surface of the tabs can be laser ablated to remove any weld burrs formed during the welding process. The laser ablation can remove the weld burrs and result in a relatively smooth flat surface, which can further reduce the risk of puncturing the separator and causing a short circuit.

Described herein are battery cells for battery packs in electric vehicles for an automotive configuration. An automotive configuration includes a configuration, arrangement or network of electrical, electronic, mechanical or electromechanical devices within a vehicle of any type. An automotive configuration can include battery cells for battery packs in electric vehicles (EVs). EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned.

FIG. 1 depicts an isometric view of an example electrode structure 100. The electrode structure 100 can be a part of a battery cell for providing electric power. For example, the battery cell can provide power to an electric vehicle. The battery cell can also be part of a battery pack that includes multiple battery cells, at least one of which includes the example electrode structure 100. The battery pack can be used to provide power to electric components, such as, for example, electric components in an electric vehicle. The electrode structure 100 can include a first polarity electrode plate 105, a second polarity electrode plate 110, a first separator 115, and a second separator 120. The first polarity electrode plate 105, the first separator 115, the second polarity electrode plate 110, and the second separator 120 can be arranged in that order and rolled into a cylindrical shape to form the electrode structure 100. Such a structure can be referred to as a "jelly-roll." In some instances, a cross-section of the electrode structure 100 can be other than circular, and can instead be oval, elliptical, rectangular or any other shape. The first polarity electrode plate 105 can be a cathode electrode plate and the second polarity electrode plate 110 can be an anode electrode plate. In some other instances, the first electrode plate can be an anode electrode plate and the second polarity electrode plate 110 can be a cathode electrode plate.

The first polarity electrode plate 105 can include a first polarity metal plate 125 and a first polarity current collector material 130 disposed on the first polarity metal plate 125. The second polarity electrode plate 110 can include a second polarity metal plate 135 and a second polarity current collector material 140 disposed on the second polarity metal plate 135. The first polarity electrode plate 105 can be a positive or cathode plate and the second polarity electrode plate 110 can be a negative or anode plate. Alternatively, the first polarity electrode plate 105 can be a negative or anode plate and the second polarity electrode plate 110 can be a positive or cathode plate. As an example, a positive or cathode electrode plate can include an aluminum (Al) metal plate coated with a positive polarity current collector material such as Lithium Cobalt Oxide ($LiCoO_2$), Lithium manganese oxide ($LiMnO_2$), lithium iron phosphate ($LiFePO_4$), lithium nickel manganese cobalt oxide (NMC) and lithium nickel cobalt aluminum oxide (NCA). As an example, a negative or anode electrode plate can include a copper metal plate with a negative polarity current collector material such as carbon compound (e.g., graphite), activated carbon, carbon black, lithium titanate (LTO), silicon, and graphene. In some examples, the first polarity electrode plate 105 and the second polarity electrode plate 110 can have length between 0.9 m and 1.1 m, a width between 55 mm and 75 mm and a thickness between 0.1 mm and 0.3 mm. In some examples, a thickness of the first polarity current collector material 130 and the second polarity current collector material can be between 10 microns and 20 microns.

The first separator 115 and the second separator 120 can be made of a porous material that insulates the first polarity electrode plate 105 and the second polarity electrode plate 110 from each other. The porosity of the first and second separators 115 and 120 allow the movement of ions between the first polarity electrode plate 105 and the second polarity electrode plate 110. The first and second separators 115 and 120 can also include a solid, semi-solid, or liquid electrolyte that acts as a catalyst that promotes the movement of the ions. The first and second separators 115 and 120 can include materials such as, for example, polyethylene, polypropylene, polyolefin, plastics, and ceramics. In some examples, the first separator 115 and the second separator 120 can have a length between 0.9 m and 1.2 m, a width between 55 mm and 75 mm, and a thickness between 10 microns and 20 microns.

The electrode structure 100 also includes a first polarity tab 145 coupled with the first polarity metal plate 125, and a second polarity tab 150 coupled with the second polarity metal plate 135. The first polarity tab 145 can electrically connect the first polarity electrode plate 105 to a first polarity terminal of a battery cell, and the second polarity tab 150 can electrically connect the second polarity electrode plate 110 to a second polarity terminal of the battery cell. At least a portion of the first polarity tab 145 can be positioned between the first polarity metal plate 125 and the second separator 120 and at least a portion can extend beyond the periphery of the first polarity metal plate 125 and the second separator 120. The extended portion of the first polarity tab 145 can be electrically connected with the first polarity terminal of the battery cell. Similarly, at least a portion of the second polarity tab 150 can be positioned between the second polarity metal plate 135 and the first separator 115 and at least a portion can extend beyond the periphery of the second polarity metal plate 135 and first separator 115. The extended portion of the second polarity tab 150 can be electrically connected to the second polarity terminal of the battery cell. The first polarity tab 145 and the second polarity tab 150 can be positioned on opposite ends of the electrode structure 100. In some examples, the first polarity tab 145 and the second polarity tab 150 can be positioned on the same end of the electrode structure 100.

Figure 2:
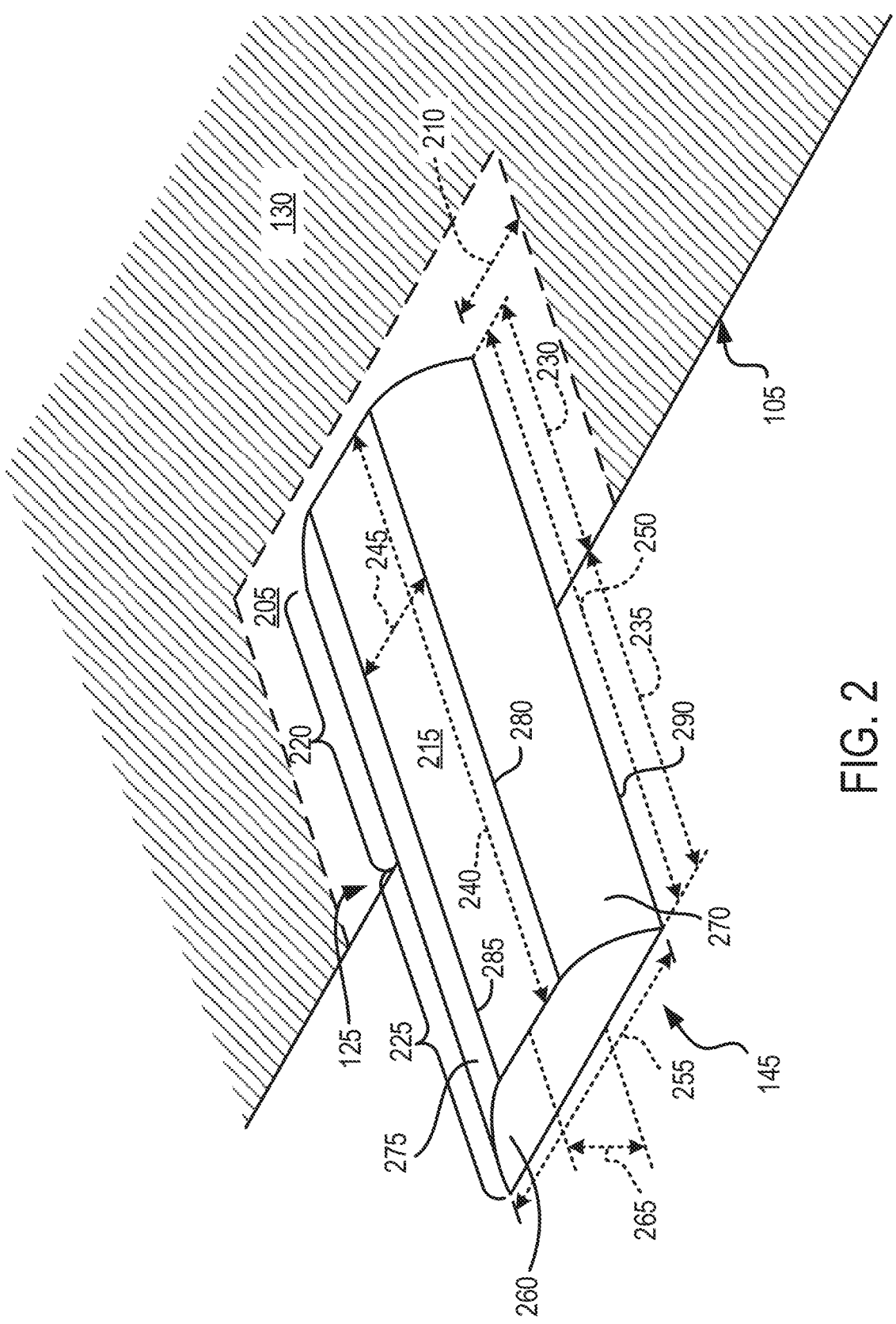
FIG. 2 shows an isometric view of a first polarity tab positioned on the first polarity electrode plate of the electrode structure shown in FIG. 1.

FIG. 2 shows an isometric view of the first polarity tab 145 positioned on the first polarity electrode plate 105. In particular, FIG. 2 shows the first polarity electrode plate 105 in an un-folded state, or in a state prior to the rolling into the electrode structure 100 shown in FIG. 1. The first polarity electrode plate 105 includes the first polarity metal plate 125 over which the first polarity current collector material 130 is disposed. The first polarity electrode plate 105 can define a first contact area 205 on the first polarity electrode plate 105. The first polarity metal plate 125 can be exposed within the first contact area 205, and may not include the first polarity current collector material 130. The first contact area 205 can provide a contact area where an electrode interface surface of the first polarity tab 145 can be coupled with the first polarity electrode plate 105. By exposing the first polarity metal plate 125 in the first contact area 205, an effectiveness of a bond between the electrode interface surface of the first polarity tab 145 and the first polarity metal plate 125 can be improved, as the bond can be a metal-to-metal bond without any intervening materials. In some instances, where an effective bond between the first polarity tab 145 and the first polarity electrode plate 105 can be formed despite the presence of intervening materials such as the first polarity current collector material 130, the first polarity electrode plate 105 may not include the first contact area 205, and the first polarity tab 145 can be positioned over the first polarity current collector material 130. The electrode interface surface can be coupled with the first polarity metal plate 125 using one or more techniques for making a metal-to-metal bond, such as, for example, ultrasonic welding, flame welding, soldering, and adhering using electrically conductive adhesives.

The first contact area 205 can have a shape and a size that can accommodate positioning the first polarity tab 145. For example, the first contact area 205 can have a shape that corresponds to the shape of the periphery of the first polarity tab 145. Thus, if the shape of the periphery of the first polarity tab 145 is rectangular, the shape of the first contact area 205 can also be rectangular. In some examples, the shape of the first contact area 205 can be different from the shape of the periphery of the first polarity tab 145. The periphery of the first contact area 205 can have a certain clearance from the periphery of the first polarity tab 145. For example, the periphery of the first contact area 205 can be at a distance 210 of between 10 mm and 45 mm from the periphery of the first polarity tab 145.

The first polarity tab 145 can include a first portion 220 that can be positioned between the first polarity electrode plate 105 and the separator. For example, in a rolled configuration, the electrode structure 100 includes the first polarity tab 145 sandwiched between the first polarity electrode plate 105 and the second separator 120. However, only a portion of the first polarity tab 145 is covered by the second separator 120, while the remainder of the first polarity tab 145 extends out of the electrode structure 100. Referring to FIG. 2, a first portion 220 of the first polarity tab 145 can be positioned between the first polarity electrode plate 105 and the second separator 120. A second portion 225 can extend out of the one end of the electrode structure 100. A length 230 of the first portion 220 can be equal to a length 235 of the second portion 225 of the first polarity tab 145. In some examples, the length 230 of the first portion 220 can be greater than the length 235 of the second portion 225. In some examples, the length 230 of the first portion 220 can be less than the length 235 of the second portion 225. As an example, the length 230 of the first portion 220 can have a value between 10 mm and 45 mm, and the length 235 of the second portion 225 can have a value between 5 mm and 40 mm.

The first polarity tab 145 can also include a flat surface 215 opposite the electrode interface surface. The flat surface 215 can provide a stable surface over which a coupling tool, such as, for example, an ultrasonic welding tool, can make contact with the first polarity tab 145. The flat surface 215 can have a rectangular shape with a length 240 and a breadth 245. The length 240 of the flat surface 215 can be equal to a length 250 of the first polarity tab 145, and the breadth 245 of the flat surface 215 can be less than a breadth 255 of the first polarity tab 145. In some examples, the length 240 of the flat surface 215 can be less than the length of the length 235 of the first polarity tab 145. The first polarity tab 145 can include a first side surface 260 that extends between the flat surface 215 and the electrode interface surface. While not visible in FIG. 2, the first polarity tab 145 can include a second side surface that extends between flat surface 215 and the electrode interface surface at an end of the flat surface 215 opposite from the end where the first side surface 260 intersects with the flat surface 215. In instances where the length 240 of the flat surface 215 is equal to the length 250 of the first polarity tab 145, the first side surface 260 and the second side surface can be perpendicular to both the flat surface 215 and to the electrode interface surface. In some instances, where the length 240 of the flat surface 215 is less than the length 250 of the first polarity tab 145, the first side surface 260 and the second side surface can form an acute angle with the electrode interface surface and an obtuse angle with the flat surface 215. In some examples, the first side surface 260 or the second side surface can be flat, while in some other examples, the first side surface 260 or the second side surface can be curved. The first polarity tab 145 can have a thickness 265 measured as a distance between the flat surface 215 and the electrode interface surface along an axis normal to the electrode interface surface.

The flat surface 215 can have a shape that is different from the rectangular shape shown in FIG. 2. For example, the flat surface 215 can have a circular, elliptical, or a polygonal (regular or irregular) shape. It should be noted that the flat surface 215 may not necessarily remain flat after the first polarity electrode plate 105 is rolled to form the electrode structure 100. In the rolled state, the first polarity electrode plate 105 can bend and have a curvature. The first polarity tab 145 can also bend with the first polarity electrode plate 105 and can conform to the curvature of the first polarity electrode plate 105. As an example, the length 250 of the first polarity tab 145 can have a value between 10 mm and 70 mm, the length 240 of the flat surface 215 can have a value between 10 mm and 70 mm, the breadth 245 of the flat surface can have a value between 0.5 mm and 1 mm, the breadth 255 of the first polarity tab can have a value between 6 mm and 10 mm, the thickness 265 of the first polarity tab 145 can have a value between 8 microns and 12 microns.

The first polarity tab 145 can include at least one intermediate surface that extends between the electrode interface surface and the flat surface. For example, the first polarity tab 145 can include a first intermediate curved surface 270 and a second intermediate curved surface 275 extending between the flat surface 215 and the electrode interface surface. The first intermediate curved surface 270 can extend between a first edge 280 of the flat surface 215 and a first edge 290 of the electrode interface surface, and the second intermediate curved surface 275 can extend between a second edge 285 of the flat surface 215 and a second edge (not shown) of the electrode interface surface. The first edge 280 and the second edge 285 of the flat surface can be parallel to the first edge 290 and the second edge, respectively, of the electrode interface surface. The first edge 280 and the second edge 285 can extend along a length of the first polarity tab 145. The first edge 280 and the second edge 285 can be parallel to the longitudinal axis of the electrode structure 100. The first and second intermediate curved surfaces 270 and 275 can also extend between the first side surface 260 and the second side surface of the first polarity tab 145.

Figure 3:
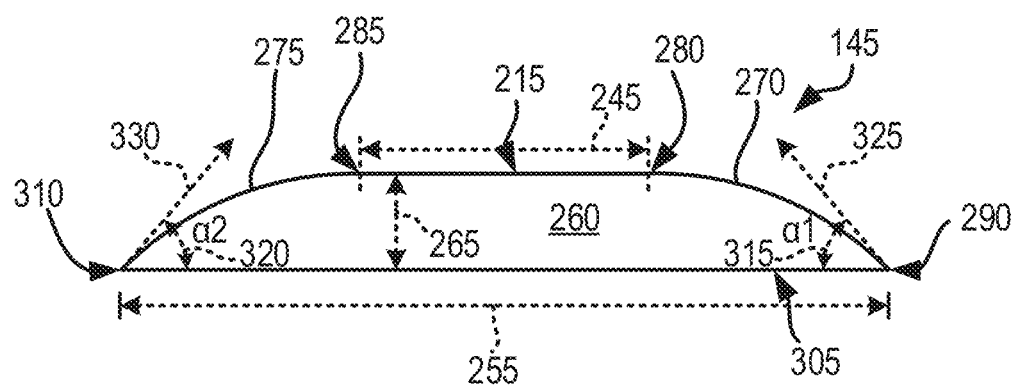
FIG. 3 shows a cross-sectional view of the first polarity tab shown in FIG. 2.

FIG. 3 shows a cross-sectional view of the first polarity tab 145 shown in FIG. 2, among others. The first polarity tab 145 includes the first intermediate curved surface 270 that extends between the first edge 280 of the flat surface 215 and a first edge 290 of the electrode interface surface 305. The first polarity tab 145 also includes the second intermediate curved surface 275 that extends between the second edge 285 of the flat surface 215 and the second edge 310 of the electrode interface surface 305. The first intermediate curved surface 270 can form a first angle 315 (α1) with the electrode interface surface 305. Similarly, the second intermediate curved surface 275 can form a second angle 320 (α2) with the electrode interface surface 305. At least one of the first angle 315 and the second angle 320 can be an acute angle (i.e., less than 90 degrees). The first angle 315 can be measured, for example, between the first intermediate curved surface 270 and the electrode interface surface 305 at the first edge 290 where the first intermediate curved surface 270 intersects with the electrode interface surface 305. As an example, the first angle 315 can be measured between a first tangent 325 to the first intermediate curved surface 270, where the first tangent 325 is tangential to the first intermediate curved surface 270 at a point of intersection between the first intermediate curved surface 270 and the electrode interface surface 305 (e.g., at the first edge 290 of the electrode interface surface 305). Similarly, the second angle 320 can be measured, for example, between the second intermediate curved surface 275 and the electrode interface surface 305 at the second edge 310 where the second intermediate curved surface 275 intersects with the electrode interface surface 305. As an example, the second angle 320 can be measured between a second tangent 330 to the second intermediate curved surface 275, where the second tangent 330 is tangential to the second intermediate curved surface 275 at a point of intersection between the second intermediate curved surface 275 and the electrode interface surface 305 (e.g., at the second edge 310 of the electrode interface surface 305).

In some examples, the first tangent 325 can be tangential to the first intermediate curved surface 270 at locations other than at the first edge 290 of the electrode interface surface 305. For example, the first tangent 325 can be tangential at a point on the first intermediate curved surface 270 midway between the first edge 280 of the flat surface 215 and the first edge 290 of the electrode interface surface 305. The first angle 315 can then be measured at a point of intersection between the first tangent 325 and the plane of the electrode interface surface 305. The second angle 320 can be similarly measured based on the location of the second tangent 330 to the second intermediate curved surface 275.

In some examples, the first angle 315 can be measured between the electrode interface surface 305 and a line segment that extends between the two ends of the curvature of the first intermediate curved surface 270. The two ends of the curvature of the first intermediate curved surface 270 can be, for example, the first edge 280 of the flat surface 215 and the first edge 290 of the electrode interface surface 305. Similarly, the second angle 320 can be measured between the electrode interface surface 305 a line segment that extends between the second edge 285 of the flat surface 215 and the second edge 310 of the electrode interface surface 305.

In some examples, the first angle 315 can be equal to the second angle 320. In some examples, the first angle 315 can be unequal to the second angle 320. In some examples, both the first angle 315 and the second angle 320 can be less than 90 degrees. In some examples, the first angle 315 and the second angle 320 can have values between 20 degrees and 60 degrees.

In some examples, the first polarity tab 145 can have a uniform cross-section along a longitudinal axis of the first polarity tab 145. The longitudinal axis of the first polarity tab 145 can be, for example, an axis that is parallel to the electrode interface surface 305 and extends along the length 250 of the first polarity tab 145. Thus, for example, the first polarity tab 145 can have a uniform cross-section along the length 250 of the first polarity tab 145. Having a uniform cross-section can include having the same shape and size of the cross-section along the longitudinal axis of the first polarity tab 145. In some examples, having a uniform cross-section can include having the breadth 255 and the thickness 265 constant along the longitudinal axis of the first polarity tab 145. Thus, while the shape of the cross-section may vary, the cross-section can still be considered as uniform as long as the breadth 255 and the thickness 265 is constant along the longitudinal axis. In some examples, the first polarity tab 145 can have non-uniform cross-section along the longitudinal axis. That is, at least one of the shape, the size, the thickness 265 and the breadth 255 can change along the longitudinal axis of the first polarity tab 145.

Figure 4:
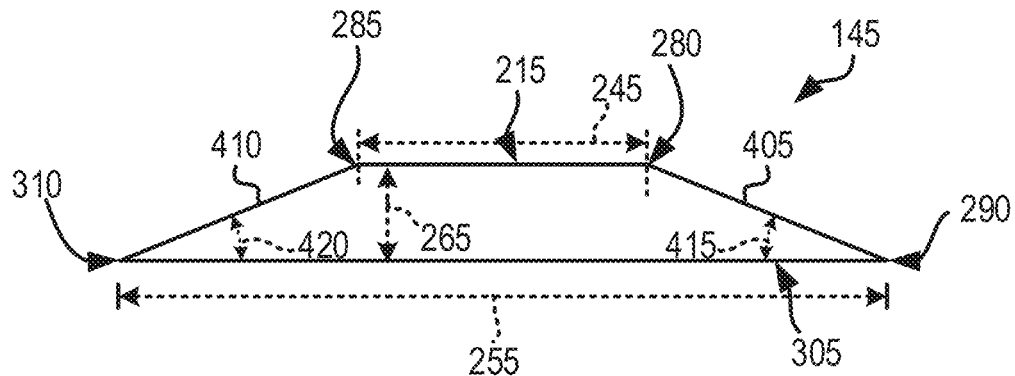
FIG. 4 shows a cross-sectional view of a first polarity tab with flat intermediate surfaces.

FIG. 4 shows a cross-sectional view of the first polarity tab 145 with flat intermediate surfaces. In contrast with the first and second intermediate curved surfaces 270 and 275 shown in FIGS. 2 and 3, the first polarity tab 145 can include a first intermediate flat surface 405 and a second intermediate flat surface 410. The first intermediate flat surface 405 extends between the first edge 280 of the flat surface and the first edge 290 of the electrode interface surface 305, and the second intermediate flat surface 410 extends between the second edge 285 of the flat surface 215 and the second edge 310 of the electrode interface surface 305. The first intermediate flat surface 405 can form a first angle 415 with the electrode interface surface 305, and the second intermediate flat surface 410 can form a second angle 420 with the electrode interface surface 305. The first angle 415 and the second angle 420 can be equal. In some examples, the first angle 415 and the second angle 420 can be unequal. The first angle 415 and the second angle 420 can be acute angles (e.g., less than 90 degrees). For example, the first angle 415 and the second angle 420 can have a value between 20 degrees and 60 degrees.

In some examples, the first intermediate flat surface 405 and the second intermediate flat surface 410 can have equal widths. The width of the first intermediate flat surface 405 can be measured as a distance between the first edge 280 of the flat surface 215 and the first edge 290 of the electrode interface surface 305, while the width of the second intermediate flat surface 410 can be measured as a distance between the second edge 285 of the flat surface 215 and the second edge 310 of the electrode interface surface 305. In some other examples, the first intermediate flat surface 405 and the second intermediate flat surface 410 can have unequal widths.

Figure 5:
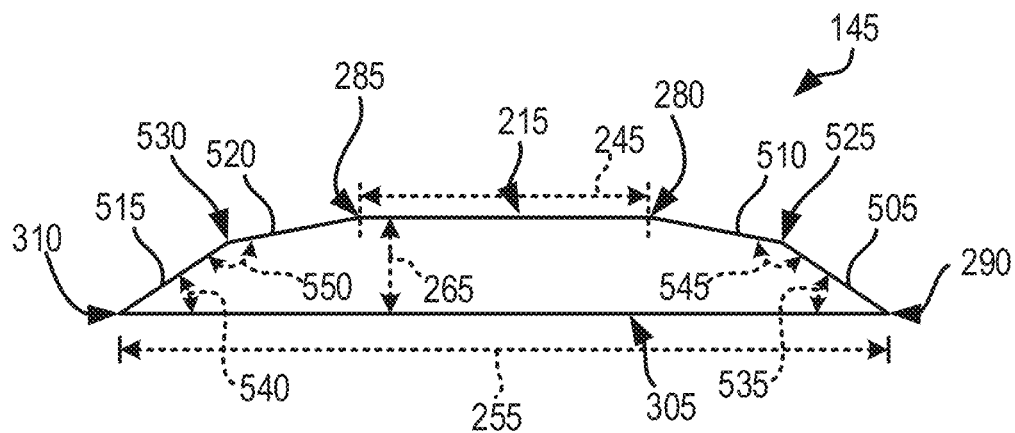
FIG. 5 shows a cross-sectional view of a first polarity tab having progressively declining intermediate surfaces.

FIG. 5 shows a cross-sectional view of a first polarity tab 145 having progressively declining intermediate surfaces. The first polarity tab 145 can include a first declining surface 505 and a second declining surface 510 extending between the first edge 280 of the flat surface 214 and the first edge 290 of the electrode interface surface 305. The first polarity tab 145 can also include a third declining surface 515 and a fourth declining surface 520 extending between the second edge 285 of the flat surface 215 and the second edge 310 of the electrode interface surface 305. The first declining surface 505 can extend between a first intermediate edge 525 and the first edge 290 of the electrode interface surface 305, and the second declining surface 510 can extend between the first intermediate edge 525 and the first edge 280 of the flat surface 215. The third declining surface 515 can extend between the second edge 310 of the electrode interface surface 305 and a second intermediate edge 530, and the fourth declining surface 520 can extend between the second intermediate edge 530 and the second edge 285 of the flat surface 215. The first intermediate edge 525 and the second intermediate edge 530 can extend along the length of the first polarity tab 145. The first and second intermediate edges 525 and 530 can be parallel to the first and second edges 280 and 285 of the flat surface 215.

The first declining surface 505 can form a first angle 535 with the electrode interface surface 305, while the second declining surface 510 can form a second angle 545 with the first declining surface 505. The third declining surface 515 can form a third angle with the electrode interface surface 305, while the fourth declining surface 520 can form a fourth angle 550 with the third declining surface 515. The first angle 535 and the third angle 540 can be acute angles (e.g., less than 90 degrees). The second angle 545 and the fourth angle 550 can be obtuse angles (e.g., greater than 90 degrees). The second declining surface 510 and the first declining surface 505 can progressively decline in relation to the electrode interface surface 305. For example, a slope of the first declining surface 505 can be greater than a slope of the second declining surface 510 in relation to the electrode interface surface 305. Similarly, a slope of the third declining surface 515 can be greater than a slope of the fourth declining surface 520 in relation to the electrode interface surface 305. The first, second, third, and fourth declining surfaces 505, 510, 515, and 520 can be flat or planar surfaces. In some examples, at least one of the first, second, third, and fourth declining surfaces 505, 510, 515, and 520 can be a curved surface. In some examples, at least one of the first, second, third, and fourth declining surfaces 505, 510, 515, and 520 can include a flat or planar portion and a curved portion. While FIG. 5 shows two progressively declining surfaces between one edge of the flat surface 215 and a corresponding edge of the electrode interface surface 305, the first polarity tab 145 can include more than two progressively declining surfaces. For example, in some instances, the first polarity tab 145 can include up to 5 progressively declining surfaces.

While FIGS. 2-5 discuss the features of the first polarity tab 145, it should be noted that the second polarity tab 150, coupled with the second polarity electrode plate 110, can have feature similar to those of the first polarity tab 145 shown in FIGS. 2-5. For example, the second polarity tab 150 also can include an electrode interface surface, similar to the electrode interface surface 305, that can be coupled with the second polarity metal plate 135 of the second polarity electrode plate 110. The second polarity tab 150 also can include a flat surface, similar to the flat surface 215, opposite the electrode interface surface. Further, the second polarity tab 150 can at least one second polarity tab intermediate surface that extends between the flat surface and the electrode interface surface. For example, the second polarity tab 150 can include a first intermediate curved surface and a second intermediate curved surface similar to the first intermediate curved surface 270 and the second intermediate curved surface 275, respectively, of the first polarity tab 145 shown in FIGS. 2 and 3. In some examples, the second polarity tab 150 can include a first intermediate flat surface and a second intermediate flat surface similar to the first intermediate flat surface 405 and the second intermediate flat surface 410 of the first polarity tab 145 shown in FIG. 4. In some examples, the second polarity tab 150 can include a set of progressively declining flat surfaces, similar to the first, second, third, and fourth declining surfaces 505, 510, 515, and 520 of the first polarity tab 145 shown in FIG. 5, between the flat surface and the electrode interface surface. The intermediate surfaces between the flat surface and the electrode interface surface of the second polarity electrode can form an acute angle with the electrode interface surface. In some examples, the angle formed by an intermediate surface with the electrode interface surface can have a value between 20 degrees and 60 degrees.

It should be noted that FIGS. 3-5 show the first polarity tab 145 in a configuration where the first polarity electrode plate 105 is not rolled to form the electrode structure 100. In this configuration, the flat surface 215, the electrode interface surface 305, and other flat intermediate surfaces can remain flat and planar. However, in a rolled configuration, these flat surfaces can bend to conform to the curvature of the first polarity electrode plate 105 within the electrode structure 100. Similarly, the flat surfaces of the second polarity tab 150 also can conform to the curvature of the second polarity electrode plate 110.

As discussed above, the first polarity tab 145 and the second polarity tab 150 are devoid of sharp edges, and instead include intermediate surfaces with angular positions that reduce the formation of sharp edges, thereby reducing the risk of puncturing the first separator 115 or the second separator 120 when the electrode structure 100 experiences physical forces that may crush or compress the electrode structure 100.

Figure 6:
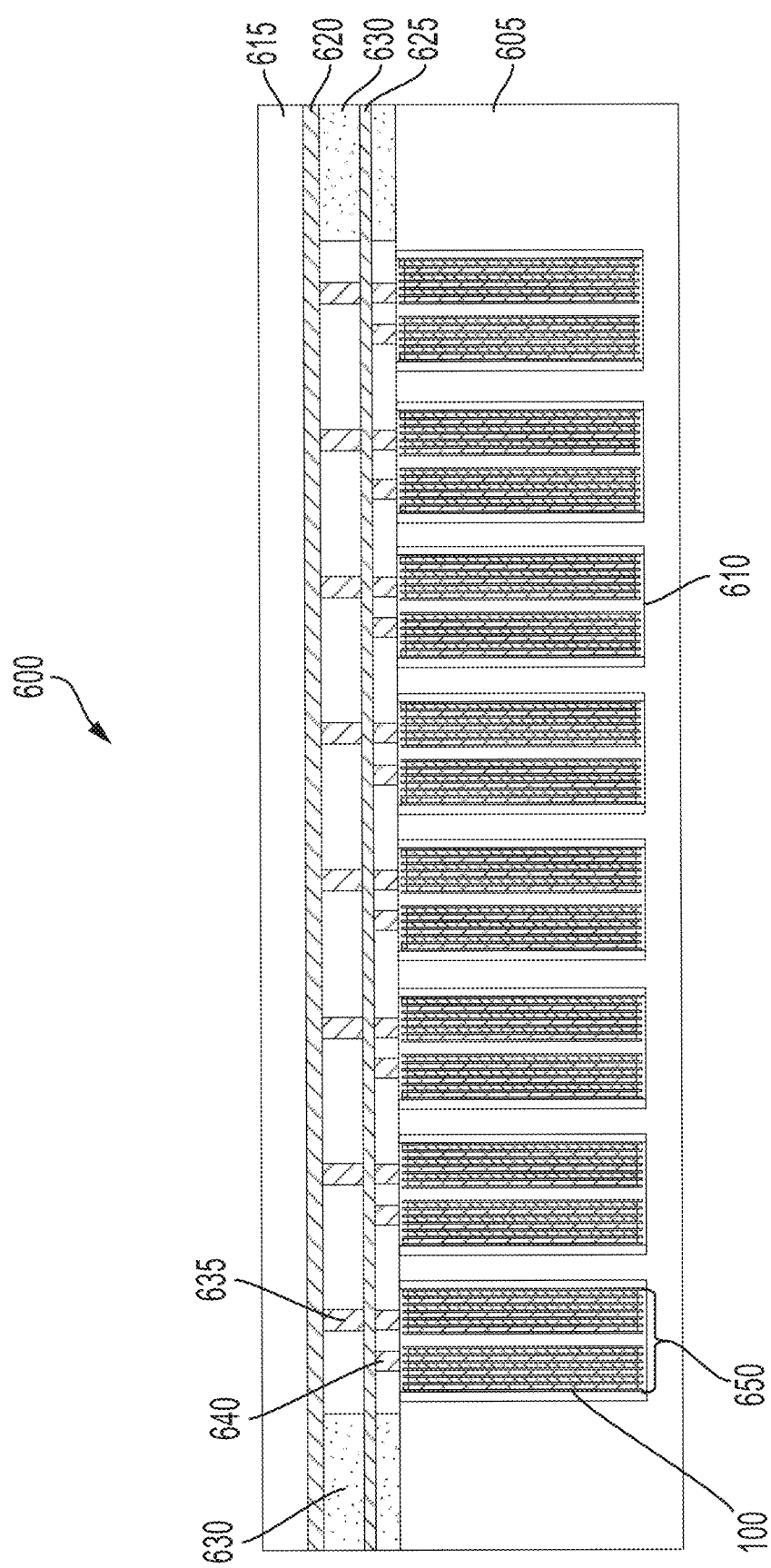
FIG. 6 depicts a cross-section view of a battery module to hold a set of battery cells in an electric vehicle.

FIG. 6 depicts a cross-section view of a battery module 600 to hold a set of battery cells 650 (e.g., at least one battery cell 650) in an electric vehicle. The battery module 600 can be of any shape. The shape of the battery module 600 can be cylindrical with a circular, elliptical, or ovular base, among others. The shape of the battery module 600 can also be prismatic with a polygonal base, such as a triangle, a square, a rectangle (e.g., as depicted), a pentagon, and a hexagon, among others. The battery module 600 can have a length ranging between 10 cm to 200 cm. The battery module 600 can have a width ranging between 10 cm to 200 cm. The battery module 600 can have a height ranging between 65 mm to 100 cm.

The battery module 600 can include at least one battery case 605 and a capping element 615. The battery case 605 can be separated from the capping element 615. The battery case 605 can include or define a set of housings 610. Each housing 610 can be or include a hollowing or a hollow portion defined by the battery case 605. Each housing 610 can house, contain, store, or hold a battery cell 650. The battery cell 650 can include, for example the electrode structure 100 discussed above in conjunction with FIGS. 1-5. The battery case 605 can include at least one electrically or thermally conductive material, or combinations thereof. Between the battery case 605 and the capping element 615, the battery module 600 can include at least one positive current collector 620, at least one negative current collector 625, and at least one electrically insulative layer 630. The positive current collector 620 and the negative current collector 625 can each include an electrically conductive material to provide electrical power to other electrical components in the electric vehicle. The positive current collector 620 (sometimes referred herein as a positive busbar) can be connected or otherwise electrically coupled with a positive conductive layer of each battery cell 650 housed in the set of housings 610 via a bonding element 635 ("a first polarity terminal"). One end of the bonding element 635 can be bonded, welded, connected, attached, or otherwise electrically coupled to tab such as one of the first polarity tab 145 and the second polarity tab 150 of the electrode structure 100. The negative current collector 625 (sometimes referred herein as a negative busbar) can be connected or otherwise electrically coupled with the other of the first polarity tab 145 or the second polarity tab 150 of the electrode structure 100 of the battery cell 650 housed in the set of housings 610 via a bonding element 640 ("a second polarity terminal"). The bonding element 640 can be bonded, welded, connected, attached, or otherwise electrically coupled to the first or second polarity tab 145 or 150 of the electrode structure 100.

The positive current collector 620 and the negative current collector 625 can be separated from each other by the electrically insulative layer 630. The electrically insulative layer 630 can include spacing to pass or fit the positive bonding element 635 connected to the positive current collector 620 and the negative bonding element 640 is connected to the negative current collector 625. The electrically insulative layer 630 can partially or fully span the volume defined by the battery case 605 and the capping element 615. A top plane of the electrically insulative layer 630 can be in contact or be flush with a bottom plane of the capping element 615. A bottom plane of the electrically insulative layer 630 can be in contact or be flush with a top plane of the battery case 605. The electrically insulative layer 630 can include any electrically insulative material or dielectric material, such as air, nitrogen, sulfur hexafluoride ($SF_6$), ceramic, glass, and plastic (e.g., polysiloxane), among others to separate the positive current collector 620 from the negative current collector 625.

Figure 7:
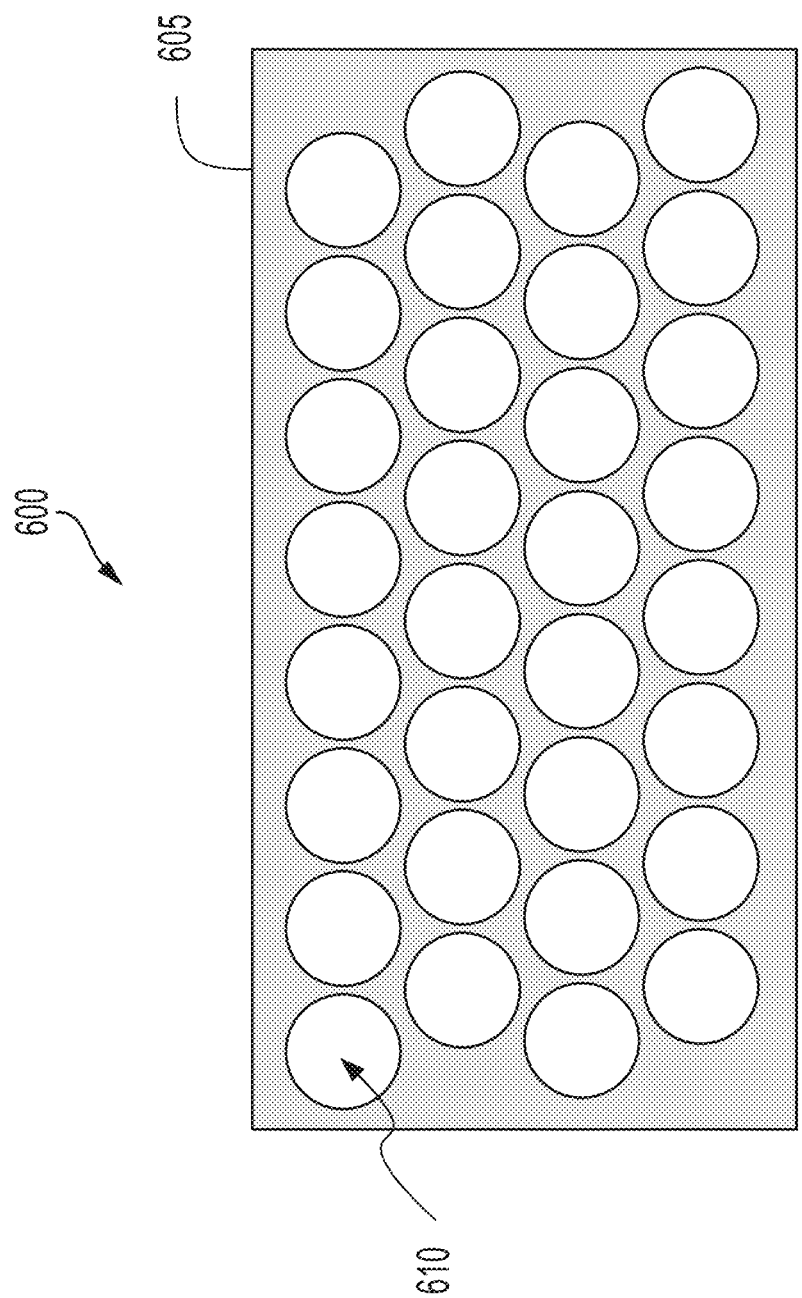
FIG. 7 depicts a top-down view of a battery module to hold a plurality of battery cells in an electric vehicle.

FIG. 7, among others, depicts a top-down view of a battery module 600 to hold a plurality of battery cells 650 in an electric vehicle. The battery module 600 can define or include a set of housings 610. The shape of each housing 610 can match a shape of the housing of the electrode structure 100. The shape of each housing 610 can be cylindrical with a circular (e.g., as depicted), elliptical, or ovular base, among others. The shape of each housing 610 can also be prismatic with a polygonal base, such as a triangle, a square, a rectangle, a pentagon, and a hexagon, among others. The shapes of each housing 610 can vary or can be uniform throughout the battery module 600. For example, some housings 610 can be hexagonal in shape, whereas other housings can be circular in shape. The dimensions of each housing 610 can be larger than the dimensions of the electrode structure 100—housed therein. Each housing 610 can have a length ranging between 10 mm to 300 mm. Each housing 610 can have a width ranging between 10 mm to 300 mm. Each housing 610 can have a height (or depth) ranging between 65 mm to 100 cm.

Figure 8:
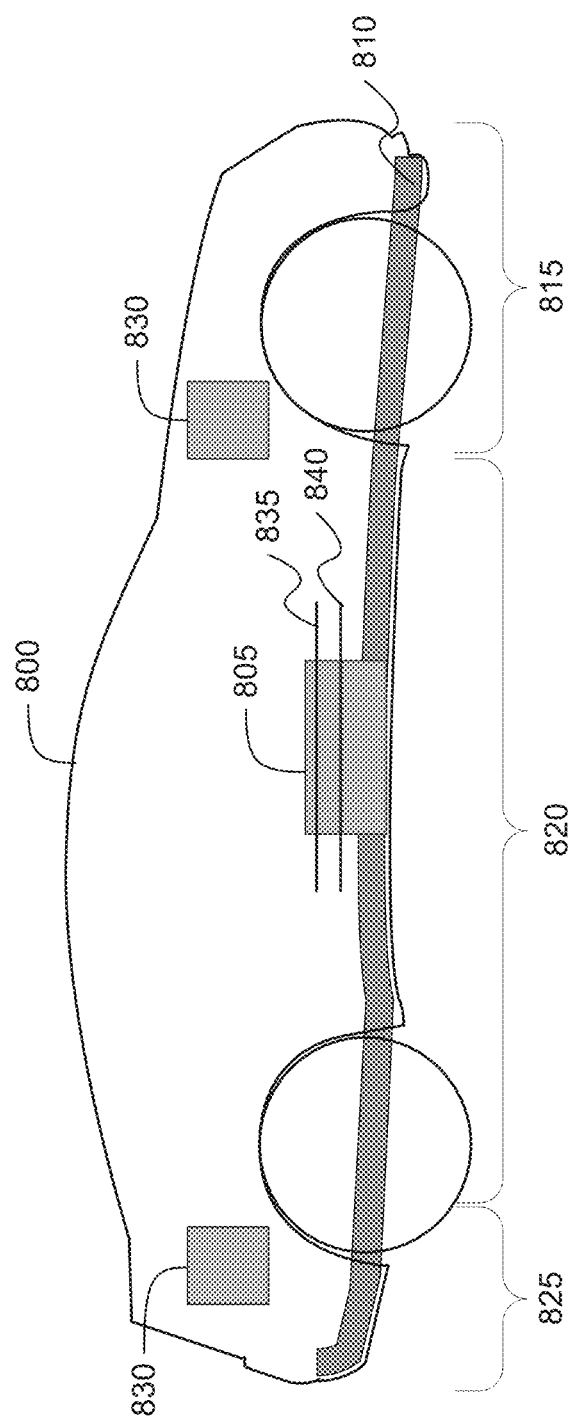
FIG. 8 depicts a cross-section view of an electric vehicle installed with a battery pack.

FIG. 8, among others, depicts a cross-section view of an electric vehicle 800 installed with a battery pack 805. The apparatus to power the electric vehicle 800 can include at least one battery cell 650 including the electrode structure 100, at least one battery module 600, and at least one battery pack 805, including the components thereof. The battery pack 805 can include one or more than one battery modules 600, for example. The electric vehicle 800 can be an electric automobile (e.g., as depicted), hybrid, a motorcycle, a scooter, a passenger vehicle, a passenger or commercial truck, and another type of vehicle such as sea or air transport vehicles, a plane, a helicopter, a submarine, a boat, or a drone, among others. The battery pack 805 can house, contain, or otherwise include a set of battery modules 600. In one example, the number of battery modules 600 in the battery pack 805 can range between one to hundred. The battery pack 805 can be of any shape. The shape of battery pack 805 can be cylindrical with a circular, elliptical, or ovular base, among others. The shape of battery pack 805 can also be prismatic with a polygonal base, such as a triangle, a square, a rectangle (e.g., as depicted), a pentagon, and a hexagon, among others. The battery pack 805 can have a length ranging between 100 cm to 600 cm. The battery pack 805 can have a width ranging between 50 cm to 400 cm. The battery pack 805 can have a height ranging between 70 mm to 1000 mm.

The electric vehicle 800 can include at least one chassis 810 (e.g., a frame, internal frame, or support structure). The chassis 810 can support various components of the electric vehicle 800. The chassis 810 can span a front portion 815 (e.g., a hood or bonnet portion), a cabin portion 820, and a rear portion 825 (e.g., a trunk portion) of the electric vehicle

800. The battery pack 805 can be installed or placed below the chassis 810 under the cabin portion 820.

The electric vehicle 800 can include one or more components 830. The one or more components 830 can include an electric engine, an entertainment system (e.g., a radio, display screen, and sound system), on-board diagnostics system, and electric control units (ECUs) (e.g., an engine control module, a transmission control module, a brake control module, and a body control module), among others. The one or more components 830 can be installed in the front portion 815, the cabin portion 820, or the rear portion 825 of the electric vehicle 800. The battery pack 805 installed in the electric vehicle 800 can provide electrical power to the one or more components 830 via at least one positive current collector 835 and at least one negative current collector 840. The positive (or first polarity) current collector 835 and the negative (or second polarity) current collector 840 can be connected or otherwise be electrically coupled to other electrical components of the electric vehicle 800 to provide electrical power. The positive current collector 835 (e.g., a positive busbar) can be connected or otherwise electrically coupled with each positive current collector 620 of each battery module 600 in the battery pack 805. The negative current collector 840 (e.g., a negative busbar) can be connected or otherwise electrically coupled with each negative current collector 625 of each battery module 600 in the battery pack 805.

Figure 9:
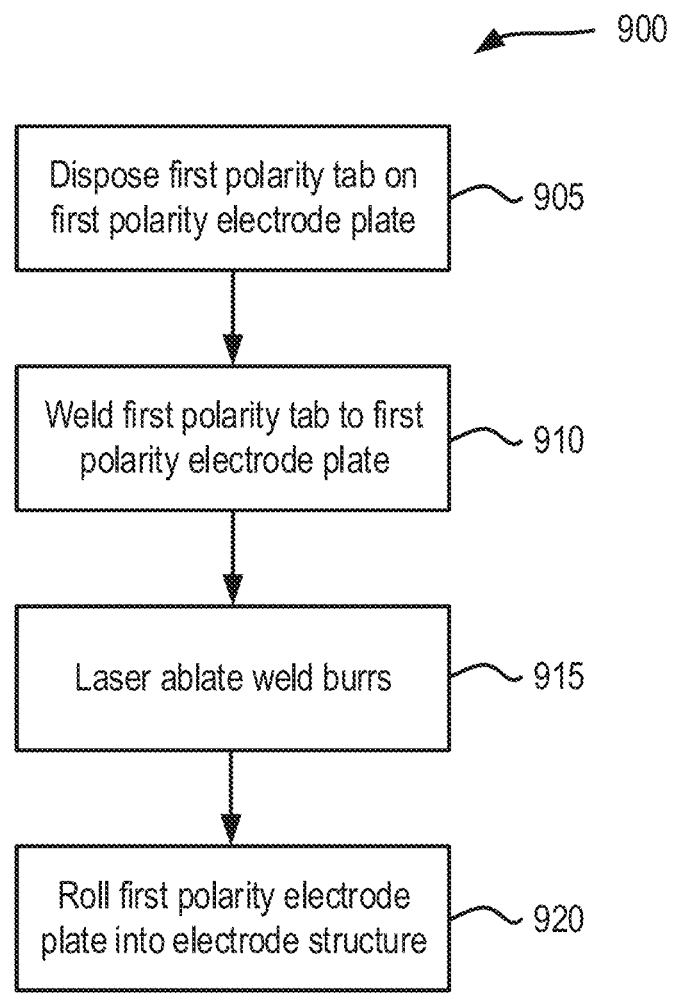
FIG. 9 depicts a method for forming an electrode structure.

FIG. 9 depicts a method 900 for forming an electrode structure of a battery cell. The functionalities of the method 900 can be implemented using the systems or apparatuses discussed above in conjunction with FIGS. 1-8. The method 900 can include disposing a first polarity tab on a first polarity electrode plate (ACT 905). The first polarity tab and the first polarity electrode plate can be similar to the first polarity tab 145 and the first polarity electrode plate 105 discussed above in relation to FIGS. 1-5. The first polarity tab 145 can be positioned on the first polarity electrode plate 105 to make contact with the first polarity metal plate 125. For example, as shown in FIG. 2, the first polarity tab 145 can be positioned over the first contact area 205 of the first polarity electrode plate 105. The first contact area 205 exposes the first polarity metal plate 125, and the first polarity tab 145 can be positioned such that the electrode interface surface (305, FIG. 3) makes contact with the first polarity metal plate 125 of the first polarity electrode plate 105.

The first polarity tab 145 can include a flat surface 215 and at least one intermediate surface that extends between the flat surface 215 and the electrode interface surface 305. For example, the first polarity tab 145 can include the first intermediate curved surface 270 that extends between the first edge 280 of the flat surface 215 and the first edge 290 of the electrode interface surface 305, and a second intermediate curved surface 275 that extends between the second edge 285 of the flat surface and the second edge 310 of the electrode interface surface 305. The first polarity tab may also include flat intermediate surfaces, or a set of progressively declining surfaces that extend between the flat surface 215 and the electrode interface surface 305. The intermediate surfaces can form an acute angle with the electrode interface surface 305.

In one example, the first polarity tab 145 can be formed by shape rolling. In shape rolling, a stock tab can be passed through one or more rollers that are positioned in a manner to provide a desired shape to the stock tab. For example, to form the first polarity tab 145 shown in FIGS. 2 and 3, a stock tab, for example, having a rectangular shape, can be passed through three rollers: a first roller positioned to form the flat shape of the flat surface 215, a second roller positioned to form the curved shape of the first intermediate curved surface 270, and a third roller also positioned to form the curved shape of the second intermediate curved surface 275. Typically, the stock tab can be a long strip of metal that can be shape rolled and then cut into appropriate lengths to form the first polarity tab 145. In some examples, the first polarity tab 145 can be formed using a forming press. A forming press can shape a metal to the desired shape using a press-tool. The press-tool can have a mold or a die that can shape a stock tab into the desired shape of the first polarity tab 145.

The material used for forming the first polarity tab 145 can be based on the polarity (positive or negative) of the first polarity electrode plate. For example, if the polarity of the first polarity electrode plate 105 is positive (or cathode), then a material such as aluminum can be used to form both the first polarity tab 145 and the first polarity metal plate 125. If the polarity of the first polarity electrode plate 105 is negative (anode), then a material such as copper can be used to form the first polarity tab 145 and the first polarity metal plate 125. Similar approach can be used to form the second polarity tab 150.

Figure 10:
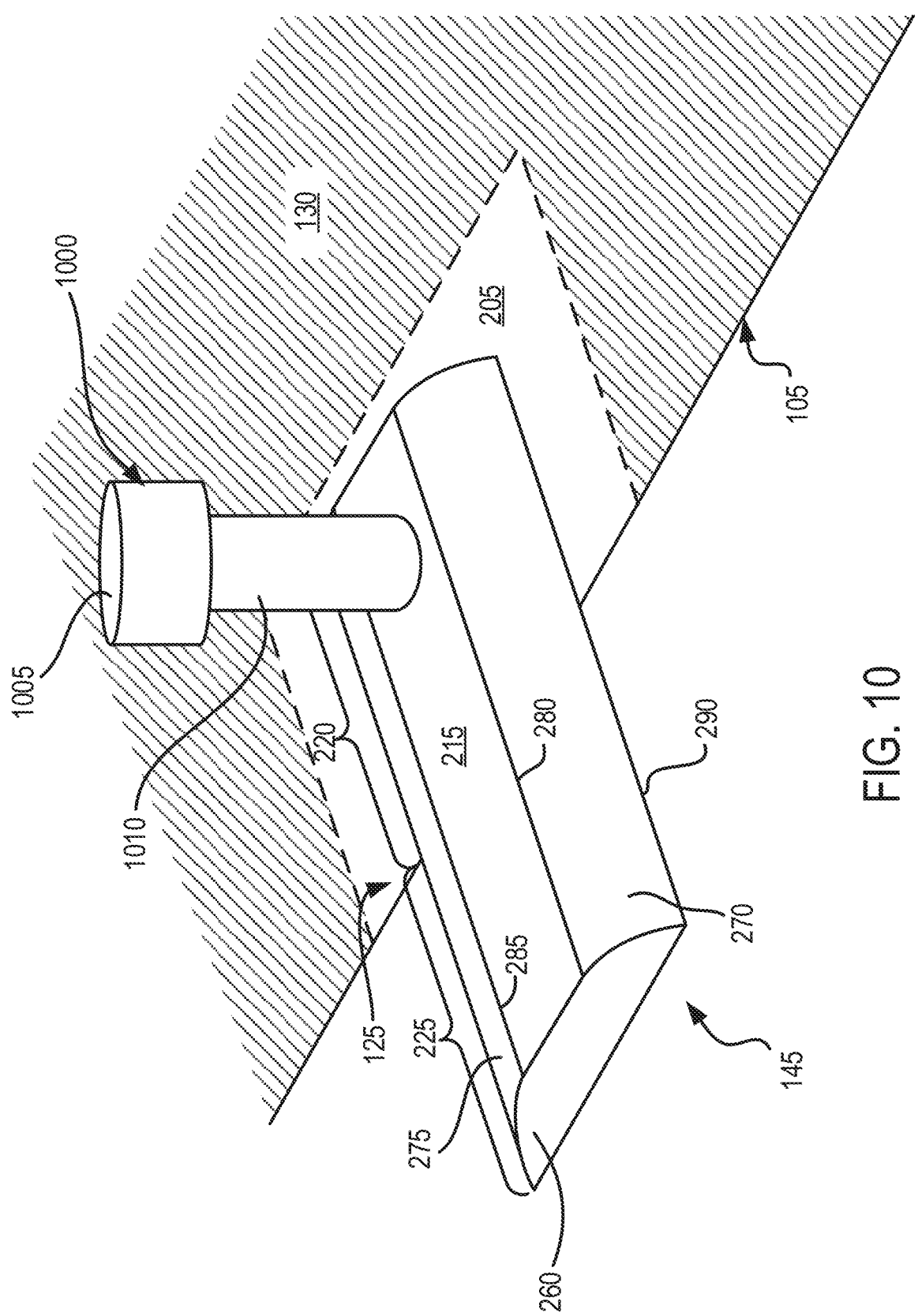
FIG. 10 shows an isometric view of a welding tool used for welding a first polarity tab to a first polarity electrode plate.

The process further includes welding the first polarity tab to the first polarity electrode plate (ACT 910). One approach to welding the first polarity tab 145 to the first polarity electrode plate 105 can include ultrasonic welding. FIG. 10 shows an isometric view of a welding tool 1000 used for welding a first polarity tab 145 to a first polarity electrode plate 105. Ultrasonic welding applies high-frequency ultrasonic acoustic vibrations to a work-pieces being held together under pressure to create a solid-state weld between the work-pieces. The welding tool 1000 can include an ultrasonic acoustic transducer 1005 and horn 1010 coupled to the transducer 1005. The transducer 1005 can generate low-amplitude vibrations in a frequency range of 15 kHz to 70 kHz. These vibrations are directed through the horn 1010. The horn 1010 can be positioned over the flat surface 215, which provides a stable surface for the positioning of the horn 1010. The horn 1010 can also be used to impart downward pressure on the first polarity tab 145 such that the electrode interface surface 305 of the first polarity tab 145 is pressed against the first polarity metal plate 125 of the first polarity electrode plate 105. The vibrations generated by the welding tool 1000 can result in local melting of the materials at the electrode interface surface 305 and the material of the first polarity metal plate 125 pressed against the electrode interface surface 305. When the tool 1000 is removed, the melted portions of the first polarity tab 145 and the first polarity metal plate 125 solidify and bind together.

Figure 11:
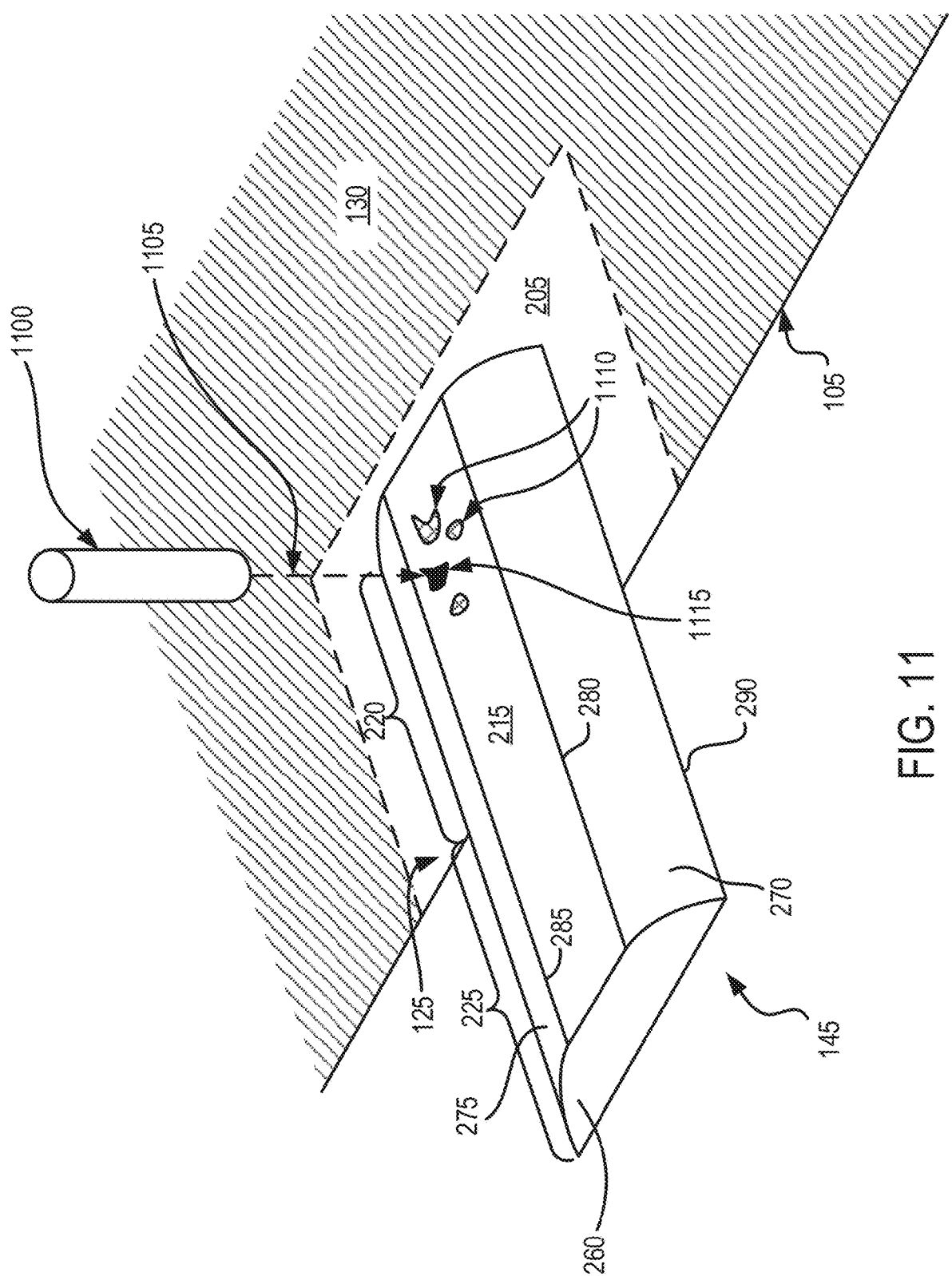
FIG. 11 shows an isometric view of a laser tool used for ablating weld burrs on the first polarity tab.

One aspect of ultrasonic welding, as discussed above, is the formation of weld burrs on the flat surface 215 at locations where the horn 1010 makes contact with the flat surface 215. These weld burrs can have sharp edges, which may increase the risk of puncturing the separator separating the first polarity electrode plate 105 and second polarity electrode plate 110. The method 900 includes laser ablating weld burrs (ACT 915). One approach to removing the weld burrs and to mitigate the risk of puncturing the separator and causing battery failure can be laser ablate the weld burrs caused by the ultrasonic welding process. FIG. 11 shows an isometric view of a laser ablation tool 1100 used for ablating weld burrs on the first polarity tab 145. For example, the flat surface 251 of the first polarity tab 145 can include weld burrs 1115 formed during the ultrasonic welding of the first polarity tab 145 to the first polarity electrode plate 105. A laser ablation tool 1100 can generate a laser beam 1105, which can be focused on the weld burrs 1115. The weld burr 1115 can absorb the energy form the incident laser beam 1105 and evaporate or sublimate, rendering the flat surface 215 to be devoid of weld burrs 1115. For example, FIG. 11 shows portions 1110 on the flat surface 215 where weld burrs have been removed by focusing the laser beam 1105 on weld burrs at the portions 1110. The laser ablation tool 1100 can generate pulsed laser beam 1105 or a continuous laser beam 1105. As an example, a carbon-dioxide ($CO_2$) laser or a neodymium-doped yttrium aluminum garnet (Nd:YAG) laser can be used at having a pulse duration between 80 microseconds to 170 femto-seconds, and a pulse repetition rate between 500 Hz and 1 kHz. Similar process step can be used to ablate weld burrs on the flat surface of the second polarity tab 150.

The method 900 includes rolling the first polarity electrode plate into an electrode structure (ACT 920). Once the weld burrs on the first polarity tab 145 (and on the second polarity tab 150) are removed, the first polarity electrode plate 105, along with the second polarity electrode plate 110, the first separator 115 and the second separator 120 can be rolled into the electrode structure, such as the electrode structure 100 shown in FIG. 1. By forming the first polarity tab 145 and the second polarity tab 150 with surfaces that lack sharp edges, and lack weld burrs, the risk of puncture or breach of the first or second separators 115 and 120 can be reduced. As a result, the risk of a short circuit or other battery failures can be reduced.

Figure 12:
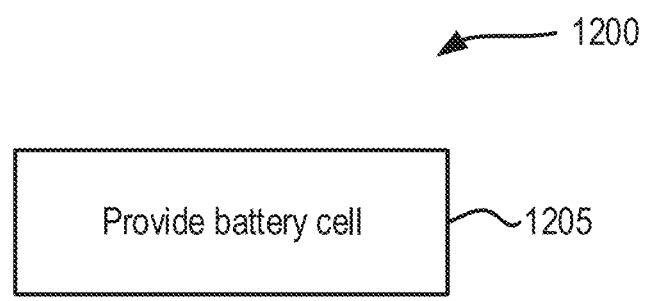
FIG. 12 depicts a method for providing a battery cell.

FIG. 12 depicts a method 1200 for providing a battery cell. The functionalities of the method 1200 can be implemented or performed using any of the systems and apparatuses detailed above in conjunction with FIGS. 1-11. The method 1200 can include providing a battery cell (ACT 1205). The battery cell can be installed in an electric vehicle 800. The battery cell 650 can include a housing 610 and an electrode structure 100 disposed in the housing 610. The electrode structure 100 can include a first polarity electrode plate 105 including a first polarity metal plate 125 and a first polarity current collector material 130 disposed on the first polarity metal plate 125. The electrode structure 100 can also include a second polarity electrode plate 110 including a second polarity metal plate 135 and a second polarity current collector material 140 disposed on the second polarity metal plate 135. The electrode structure 100 can further include a separator (115/120) positioned between the first polarity electrode plate 105 and the second polarity electrode plate 110. The separator (115/120) can have pores through which ions can be exchanged between the first polarity electrode plate 105 and the second polarity electrode plate 110. The electrode structure 100 also can include a first polarity tab 145 that electrically connects the first polarity electrode plate 105 to positive bonding element 635 of the battery cell 650. The first polarity tab 145 can include an electrode interface surface 305 coupled with the first polarity metal plate 125, a flat surface 215 opposite the electrode interface surface 305, and at least one intermediate surface (270/275) that extends between the electrode interface surface 305 and the flat surface 215 and that forms an acute angle (315/320) with the electrode interface surface 305.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Systems and methods described herein may be embodied in other specific forms without departing from the characteristics thereof. For example, descriptions of positive and negative electrical characteristics (e.g., polarities) may be reversed. Elements described as negative elements can instead be configured as positive elements and elements described as positive elements can instead by configured as negative elements. The battery cell that is part of the electrode structure 100 can provide power to electric vehicles (including hybrids) as well as other machines that are not electric vehicles, such as unmanned robotic or other devices, including devices that are not transport vehicles. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery cell to power an electric vehicle, comprising:
a housing;
an electrode structure disposed in the housing, including:
a first polarity electrode plate including:
a first polarity metal plate, and
a first polarity current collector material disposed on the first polarity metal plate;
a second polarity electrode plate including:
a second polarity metal plate, and
a second polarity current collector material disposed on the second polarity metal plate;
a separator positioned between the first polarity electrode plate and the second polarity electrode plate, the separator having pores through which ions are exchanged between the first polarity electrode plate and the second polarity electrode plate; and
a first polarity tab at least partially positioned between the first polarity electrode plate and the separator that electrically connects the first polarity electrode plate to a first polarity terminal of the battery cell, including:
an electrode interface surface coupled with the first polarity metal plate of the first polarity electrode plate,
a flat surface opposite the electrode interface surface and facing the separator, and
at least one intermediate surface that extends between the electrode interface surface and the flat surface and that forms an acute angle with the electrode interface surface in a plane perpendicular to the first polarity metal plate.

2. The battery cell of claim 1, wherein:
the at least one intermediate surface includes a curved surface.

3. The battery cell of claim 1, wherein:
the at least one intermediate surface includes:
a first intermediate curved surface that extends between a first edge of the flat surface and a first edge of the electrode interface surface, and
a second intermediate curved surface that extends between a second edge of the flat surface and a second edge of the electrode interface surface.

4. The battery cell of claim 1, wherein:
the at least one intermediate surface includes:
a first intermediate flat surface that extends between a first edge of the flat surface and a first edge of the electrode interface surface, and
a second intermediate flat surface that extends between a second edge of the flat surface and a second edge of the electrode interface surface.

5. The battery cell of claim 1, wherein:
the at least one intermediate surface includes:
a first plurality of progressively declining flat surfaces that extend between a first edge of the flat surface and a first edge of the electrode interface surface, and
a second plurality of progressively declining flat surfaces that extend between a second edge of the flat surface and a second edge of the electrode interface surface.

6. The battery cell of claim 1, wherein:
the acute angle between the at least one intermediate surface and the electrode interface surface has a value between 20 degrees and 60 degrees.

7. The battery cell of claim 1, wherein:
the first polarity tab has a uniform cross section along a longitudinal axis of the first polarity tab.

8. The battery cell of claim 1, wherein:
at least a portion of the flat surface and at least a portion of the at least one intermediate surface are in contact with the separator.

9. The battery cell of claim 1, wherein:
the first polarity electrode plate, the separator and the second polarity electrode plate are rolled into a cylindrical shape, and
the electrode interface surface conforms to a curvature of the first polarity electrode plate.

10. The battery cell of claim 1, wherein:
the first polarity electrode plate, the separator and the second polarity electrode plate are rolled into a cylindrical shape,
a first portion of the first polarity tab is positioned between the first polarity electrode plate and the separator, and
a second portion of the first polarity tab extends out of one end of the electrode structure.

11. The battery cell of claim 1, wherein:
the first polarity tab has a thickness, measured as a distance between the flat surface and the electrode interface surface, between 8 microns and 12 microns.

12. The battery cell of claim 1, wherein a width of the flat surface is between 0.5 millimeter and 1 millimeter.

13. The battery cell of claim 1, wherein a width of the electrode interface surface is between 6 millimeters and 10 millimeters.

14. The battery cell of claim 1, wherein:
the electrode structure includes:
a second polarity tab that electrically connects the second polarity electrode plate to a second polarity terminal of the battery cell, including:

a second polarity electrode interface surface coupled with the second polarity metal plate of the second polarity electrode plate, a second polarity tab flat surface opposite the second polarity electrode interface surface, and at least one second polarity tab intermediate surface that extends between the second polarity electrode interface surface and the second polarity tab flat surface and that forms an acute angle with the second polarity electrode interface surface in a plane perpendicular to the second polarity metal plate.

15. An electric vehicle, comprising:

a battery pack to power one or more components of the electric vehicle; and a battery cell arranged in the battery pack, the battery cell comprising:

a housing;

an electrode structure disposed in the housing, including:

a first polarity electrode plate including:
a first polarity metal plate, and
a first polarity current collector material disposed on the first polarity metal plate;

a second polarity electrode plate including:
a second polarity metal plate, and
a second polarity current collector material disposed on the second polarity metal plate;

a separator positioned between the first polarity electrode plate and the second polarity electrode plate, the separator having pores through which ions are exchanged between the first polarity electrode plate and the second polarity electrode plate; and a first polarity tab at least partially positioned between the first polarity electrode plate and the separator that electrically connects the first polarity electrode plate to a first polarity terminal of the battery cell, including:

an electrode interface surface coupled with the first polarity metal plate of the first polarity electrode plate, a flat surface opposite the electrode interface surface and facing the separator, and at least one intermediate surface that extends between the electrode interface surface and the flat surface and that forms an acute angle with the electrode interface surface in a plane perpendicular to the first polarity metal plate.

16. The electric vehicle of claim 15, wherein:
the at least one intermediate surface includes a curved surface.

17. The electric vehicle of claim 15, wherein:
the acute angle between the at least one intermediate surface and the electrode interface surface has a value between 40 degrees and 60 degrees.

18. The electric vehicle of claim 15, wherein:
the at least one intermediate surface includes:
a first intermediate flat surface that extends between a first edge of the flat surface and a first edge of the electrode interface surface, and
a second intermediate flat surface that extends between a second edge of the flat surface and a second edge of the electrode interface surface.

19. A method, comprising:
providing a battery cell, the battery cell disposed in a battery pack to power electric vehicles, the battery cell comprising:

a housing;

an electrode structure disposed in the housing, including:

a first polarity electrode plate including:
a first polarity metal plate, and
a first polarity current collector material disposed on the first polarity metal plate;

a second polarity electrode plate including:
a second polarity metal plate, and
a second polarity current collector material disposed on the second polarity metal plate;

a separator positioned between the first polarity electrode plate and the second polarity electrode plate, the separator having pores through which ions are exchanged between the first polarity electrode plate and the second polarity electrode plate; and a first polarity tab at least partially positioned between the first polarity electrode plate and the separator that electrically connects the first polarity electrode plate to a first polarity terminal of the battery cell, including:

an electrode interface surface coupled with the first polarity metal plate of the first polarity electrode plate, a flat surface opposite the electrode interface surface and facing the separator, and at least one intermediate surface that extends between the electrode interface surface and the flat surface and that forms an acute angle with the electrode interface surface in a plane perpendicular to the first polarity metal plate.

* * * * *